United States Patent [19]
Heidemann

[11] Patent Number: 5,631,760
[45] Date of Patent: May 20, 1997

[54] APPARATUS FOR THE OPTICAL HETERODYNE RECEPTION OF SIGNALS

[75] Inventor: Rolf Heidemann, Tamm, Germany

[73] Assignee: Alcatel N.V., Amsterdam, Netherlands

[21] Appl. No.: 792,851

[22] Filed: Nov. 15, 1991

[30] Foreign Application Priority Data

Nov. 15, 1990 [DE] Germany .................... 40 36 468.2

[51] Int. Cl.$^6$ .................................................. H04B 10/06
[52] U.S. Cl. ........................................................ 359/191
[58] Field of Search ............................ 359/191, 192, 359/189; 372/20

[56] References Cited

U.S. PATENT DOCUMENTS

| | | | |
|---|---|---|---|
| 4,885,753 | 12/1989 | Okai et al. | 372/45 |
| 5,023,950 | 6/1991 | Tsushima et al. | 359/191 |
| 5,134,509 | 7/1992 | Olshansky et al. | 359/132 |

FOREIGN PATENT DOCUMENTS 0153230  8/1985  Japan ................. H04B 1/26

OTHER PUBLICATIONS

Y.C. Chung, et al., "Frequency–Locking of a 1.5 μm DFB Laser to an Atomic Krypton Line Using Optogalvanic Effect", Electronic Letters, 4 Aug. 1988, vol. 24, No. 16.

S. Sudo, et al., "Frequency–Stabilized DFB Laser Module Using 1.53159 μm . . . ", IEEE Photonics Tech. Letters, vol. 1, No. 10, Oct. 1989.

Von Otto Strobel et al., "Optischer Uberlagerungsempfang—eine Ubersicht" Frequenz 41, 8, 1987, Germany, pp. 201–208.

Bachus et al, "Coherent Optical Multi–Channel Subscriber Line", *ISSLS '86*, 3 Oct. 1986, pp. 205–209.

*Primary Examiner*—Wellington Chin
*Assistant Examiner*—R. Bacares
*Attorney, Agent, or Firm*—Robbins, Berliner & Carson, LLP

[57] ABSTRACT

The invention relates to a heterodyne receiver, preferably for multichannel reception, especially for the reception of optical signals, in which the received signal is mixed with an oscillator signal of an oscillator in a mixing stage, to generate an intermediate frequency in an intermediate frequency stage (IF stage). According to the invention, the frequency ($f_{LO}$) of the oscillator is tuneable discontinuously in jumps (Sp1, Sp2), and the intermediate frequency stage is tuneable continuously.

7 Claims, 3 Drawing Sheets

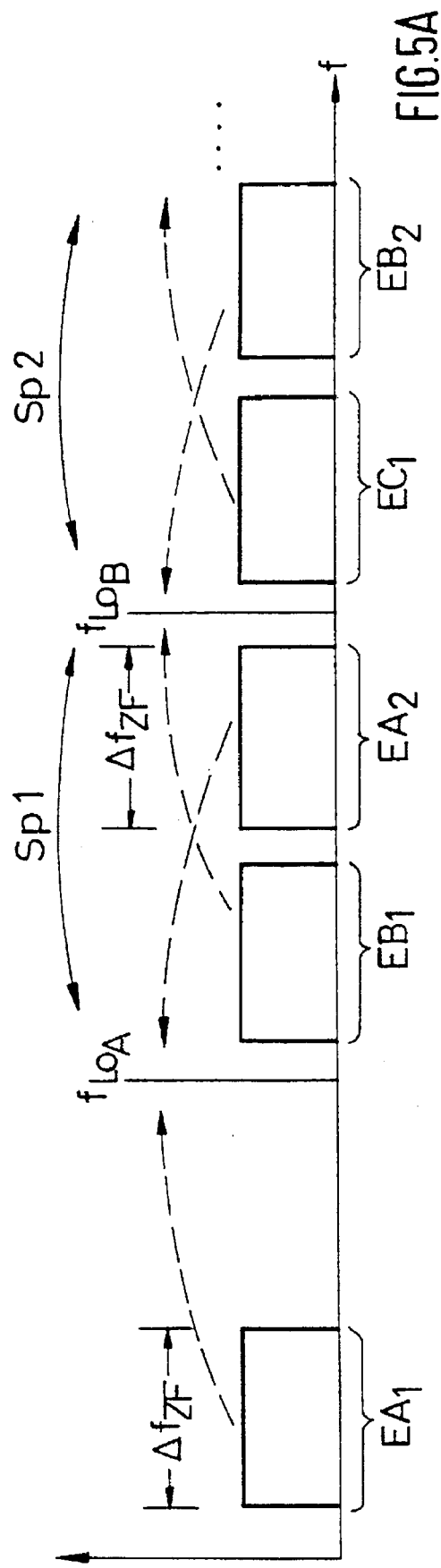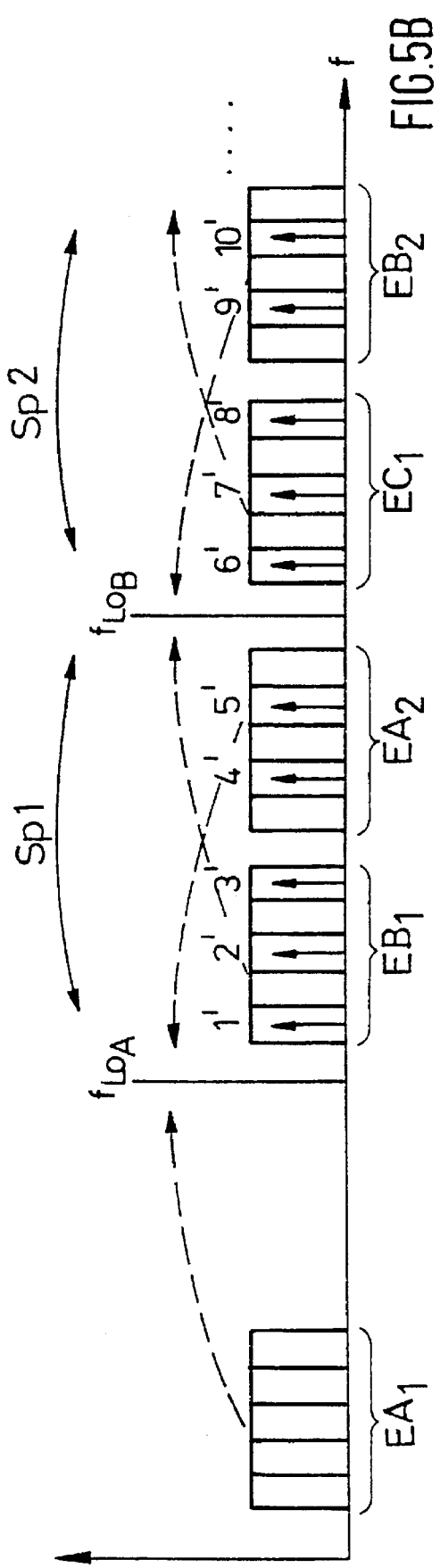

APPARATUS FOR THE OPTICAL HETERODYNE RECEPTION OF SIGNALS

TECHNICAL FIELD

The invention relates to a heterodyne receiver, preferably for multichannel reception of optical signals, and/or to a transmitter for use with such a heterodyne receiver.

BACKGROUND ART

Characteristic for heterodyne receivers is a mixing stage which mixes the received signal with a reference wave generated by a local oscillator. If the signal received by the mixing stage is an optical signal and the reference wave is an optical wave, the apparatus is an optical heterodyne receiver.

The optical signal input is fed into a mixing stage e.g. a PIN-diode. This mixing stage is connected to an optical oscillator. The mixing stage produces a difference frequency. At the output of the mixing stage an intermediate frequency (IF) is made available. Preferentially, an intermediate frequency filter is provided as an intermediate frequency stage.

Such an optical heterodyne receiver is known from the periodical FREQUENZ 41 (1987) 8, pages 201 thru 208.

As for the frequency tuning of a heterodyne receiver, two possible ways are known: The first is to keep constant the intermediate frequency for which the IF stage is set, while the frequency of the local oscillator is tuneable. For optical heterodyne receivers this has the advantage of wide optical tuning range. Furthermore, the IF filter needs to be tuned to just one fixed intermediate frequency. A disadvantage is that the optical oscillator must be continuously tuneable, which results in stability difficulties. Its linewidth is generally relatively broad, so that phase noise does occur.

Alternatively, it is known to provide a fixed frequency of the optical oscillator. This frequency, thus, can not be varied. Then, however, the intermediate frequency stage is tuneable in order to have the optical receiver tuneable. This has the advantage of a good stability of the optical heterodyne receiver, however the disadvantage of only a small available optical tuning range.

DISCLOSURE OF INVENTION

The invention has, therefore, the objective of establishing an optical heterodyne receiver of the kind described in the introduction, which avoids the above-mentioned disadvantages and which accomplishes a very good heterodyne reception with a relatively simple construction and an optimal tunability. Furthermore, a transmitter for such a heterodyne receiver is to be provided whose transmitting frequencies are selected advantageously for multichannel transmission.

According to the invention, the optical oscillator is not tuneable continuously, but in steps (frequency steps). The continuous tuning is carried out in the variable IF stage. The advantage of this is, that an optical oscillator can be constructed which is highly stable in frequency, since the individual frequency steps are each obtainable with a high stability. The continuous tuning of the variable IF stage can also be optimally obtained by means of circuitry, so that everything considered, an excellent heterodyne reception of optical signals can be achieved.

Additional embodiments of the invention can be found in the following description.

BRIEF DESCRIPTION OF DRAWINGS

The drawings depict the inventions with reference to the exemplary embodiments, and show:

FIG. 5a a diagram showing, in accordance with the invention, the tuning range of a heterodyne receiver in a second exemplary embodiment, and FIG. 5b a diagram similar to FIG. 5a, but indicating the designated transmitting frequencies in a transmitter associated with a heterodyne receiver constructed in accordance with the invention.

BEST MODE FOR CARRYING OUT THE INVENTION

Figure 1:
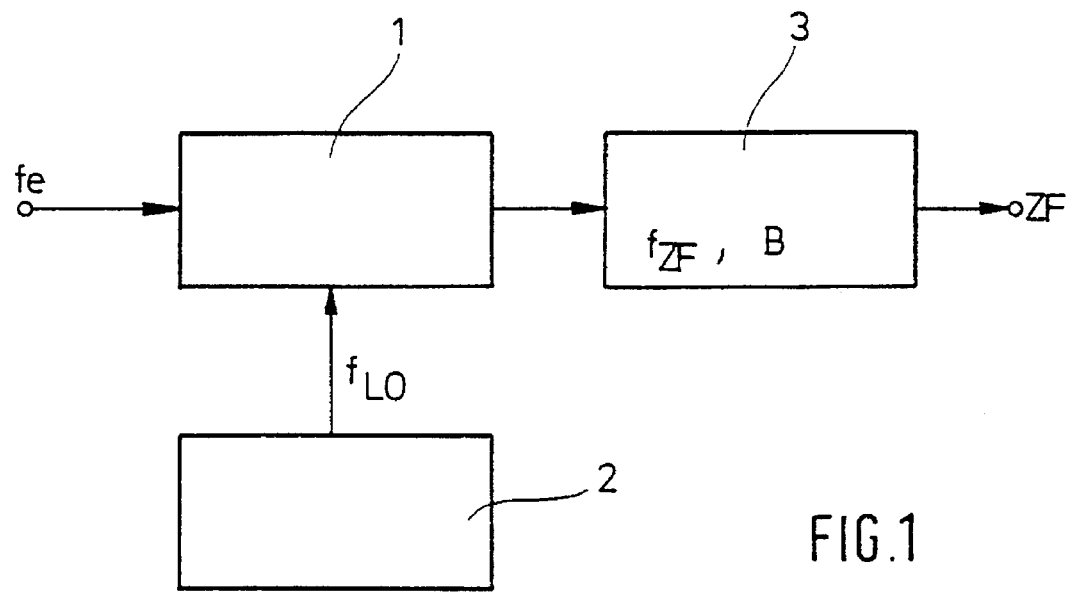
FIG. 1 a block diagram of a heterodyne receiver.

FIG. 1 is a block diagram explaining the heterodyne receiver complying with the invention, by the example of an optical heterodyne receiver. The optical heterodyne receiver has a mixing stage 1, receiving an optical input signal fe. Furthermore, it has an optical oscillator 2, which delivers an optical wave with a frequency $f_{LO}$. This optical wave is fed into the mixing stage 1. The mixing stage 1 generates an intermediate frequency signal with a frequency $f_{IF}$ which is fed into a IF-filter 3. The IF-filter 3 generates a pass band having width B. The intermediate frequency is the result of the difference of the two input signals of the mixing stage 1, it being immaterial which one of the two input frequencies is subtracted from the other one. The intermediate frequency $f_{IF}$ can thus result from an optical input signal frequency $f_{e1}$, according to $$f_{IF} = f_{LO} - f_{e1}$$

or from an optical input signal frequency $f_{e2}$, according to $$f_{IF} = f_{e2} - f_{LO}.$$

Figure 2:
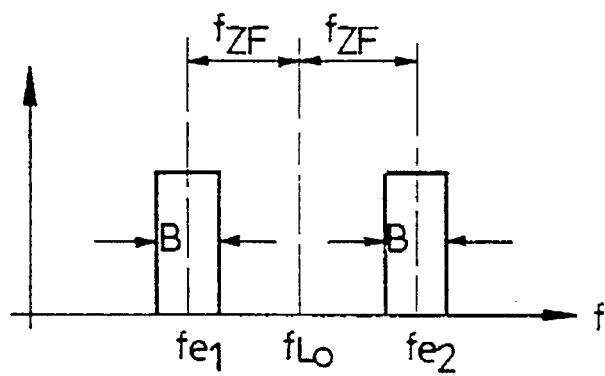
FIG. 2 a diagram explaining the interrelation of the local oscillator frequency, the intermediate frequency and the reception frequencies of heterodyne receivers, FIG. 3 a diagram similar to FIG. 2, but showing how the reception frequency is tuned by tuning of the intermediate frequency, FIG. 4a a diagram showing the tuning range of a heterodyne receiver corresponding to the invention, FIG. 4b a diagram similar to FIG. 4a, but indicating the designated transmitting frequencies in a transmitter constructed in accordance with the invention.

Therefore, as shown in FIG. 2, the frequencies $f_{e1}$ and $f_{e2}$ to which the heterodyne receiver is sensitive, are:

$$f_{e1} = f_{LO} - f_{IF}$$

$$f_{e2} = f_{LO} + f_{IF}$$

Because the IF-filter 3, tuned to $f_{IF}$, has a band width B, the heterodyne receiver of FIG. 1 is sensitive to input signal frequencies within the band width B, at $f_{e1}$ or at $f_{e2}$, $f_{e1}$ is called the mirror frequency of $f_{e2}$ and vice versa.

If $f_{IF}$ is fixedly tuned according to the previously mentioned first tuning alternative, as depicted in FIG. 2, and the frequency $f_{LO}$ of the local oscillator is variably tuneable, the result has the advantage of a large optical tuning range:

e.g. $\Delta\lambda = 1$ mm, that is $\Delta_{LO} = 125$ GHZ (at 1550 nm).

A disadvantage of this known solution is the difficulty appearing because of the continuous tuning range of the optical oscillator 2. This difficulty is inherent in the frequency stabilization of the continuously tuneable oscillator frequency.

Figure 3:
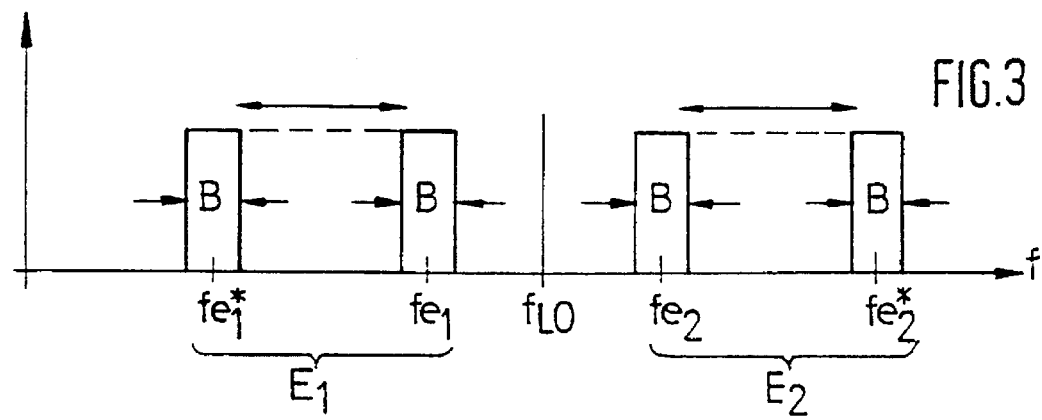

FIG. 3 depicts the other known variation, in which the frequency $f_{LO}$ of the oscillator 2 is fixed at a certain value and the intermediate frequency $f_{IF}$ is tuneable. This also renders the entire optical receiver tuneable. The tuning ranges are indicated in FIG. 3 with double headed arrows. One reception section is labelled $E_1$ and the mirror frequency section coordinated to this reception section is labelled $E_2$. Conversely, $E_1$ is also the mirror frequency of $E_2$.

This known method for tuning a heterodyne receiver has the advantage that the oscillator 2 can be very well stabilized due to its fixed frequency. In the case of an optical heterodyne receiver, however, it is disadvantageous that only a small optical tuning range is possible, e.g. |fe*−fe|=20 GHz. Thus it follows:

$$\Delta\lambda = 0.15 \text{ nm (at 1550 nm)}$$

fe*−fe| denotes the intermediate frequency change obtainable by the tuning.

Figure 4A:
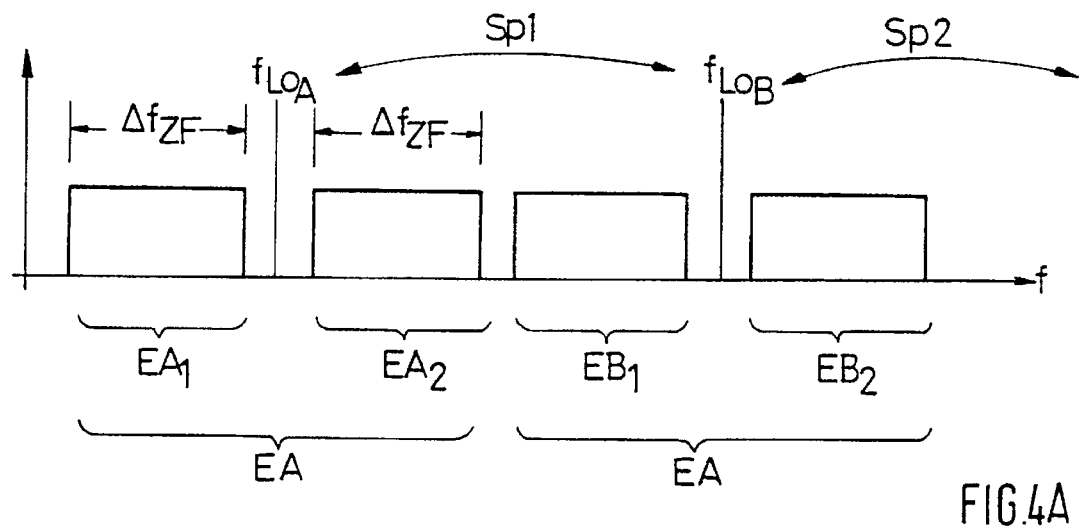

In the optical heterodyne receiver according to the invention, provision is made that the optical oscillator 2 is tuneable not continuously, but only in jumps Sp1, Sp2 (FIG. 4, FIG. 5). The continuous tuning is carried out in a variable IF-stage. FIG. 4a shows which reception frequency ranges result from the tuning capability of the new heterodyne receiver in accordance with the present invention. On a frequency axis are marked a frequency $f_{LOA}$ of the oscillator 2 and another frequency $f_{LOB}$ of the oscillator 2. Between these two frequencies lies a jump Sp1. One more jump Sp2 is shown incomplete. To the left of the frequency $f_{LOA}$ lies a reception section $EA_1$, to the right of the frequency $f_{LOA}$ lies a reception section $EA_2$. $EA_1$ and $EA_2$ are mirror frequency sections of each other, and, together, constitute a reception range EA.

To the left of the frequency $f_{LOB}$ lies a reception section $EB_1$, and to the right of it lies a reception section $EB_1$. $EB_1$ and $EB_2$ are mirror frequency sections of each other, and, together, constitute a reception range EB.

Thus, a quasi-continuous coverage of an input frequency band is made possible.

The arrangement in accordance with the invention has the advantage that many types of highly stable oscillators which are predisposed to tuning in jumps, are available for the use as a local oscillator. Semiconductor lasers, especially, can be used for optical heterodyne receivers. Their tendency for tuning in jumps, normally undesirable, is purposefully utilized in accordance with the invention. For instance, because of the mode distance, an external cavity laser with a cavity length of 12 mm jumps typically by 0.1 nm, that is 12.5 GHz (at 1550 nm). In addition, tuneable erbium-fiber ring lasers are also suitable. All of these laser types can be frequency stabilized at molecular resonances.

The principle of such stabilization is known from "Electronics Letters", Vol. 24, August 1988, No. 16, pages 1048 thru 1049. Many of these resonances have ambiguities in the GHz range, e.g. in the absorption spectrum of acetylene. As such, this is known from "IEEE Phot. Techn. Letters", Vol 1, No. 10, October 1989, pages 281 thru 284.

Advantageously, a tuneable microwave receiver can be employed as the IF stage. If the tuning is carried out as shown in FIG. 4a, the IF stage, that is the tuneable microwave receiver, should be continuously tuneable from almost 0 GHz thru e.g. 6 GHz. In that case, it is technically difficult to reach the extreme low frequencies at the lower frequency limit.

With reference to FIG. 5a an exemplary embodiment of the invention is described in which the IF stage needs not to be tuned down to nearly 0 GHz. In this embodiment example the frequency jumps of the oscillator 2 and the tuning range of the IF stage are selected in such a way that the reception sections provided by one oscillator frequency are interleaved with reception sections provided by other oscillator frequencies.

This is explained in FIG. 5a. FIG. 5a shows that the reception sections $EA_1$, $EA_2$ respectively $EB_1$, $EB_2$ assigned to the oscillator frequencies $f_{LOA}$ and $f_{LOB}$ are arranged and interleaved in such a way that between one reception section (for instance $EB_1$) and its mirror frequency reception section (for instance $EB_2$), are located reception sections assigned to other oscillator frequencies. For instance, between $EB_1$ and $EB_2$, both of which are assigned to the oscillator frequency $f_{LOB}$, there are located a reception section $EA_2$, assigned to an oscillator frequency $f_{LOA}$, and a reception section $EC_1$ assigned to an oscillator frequency $f_{LOC}$ (not shown).

By this it is possible, as with the tuning of the heterodyne receivers according to FIG. 4a, to cover a wide frequency range. Here, however, with the advantage that the intermediate frequency needs not to be tuned down to nearly 0, but rather only in the range of approximately one octave, e.g. 3 thru 6 GHz.

It was shown in FIGS. 4a and 5a which reception frequencies can be obtained by the tuning, according to the invention, of the heterodyne receiver. The frequency fe of a received signal of the heterodyne receiver according to the invention, can assume any values within the reception sections shown in FIGS. 4a and 5a.

Figure 4B:
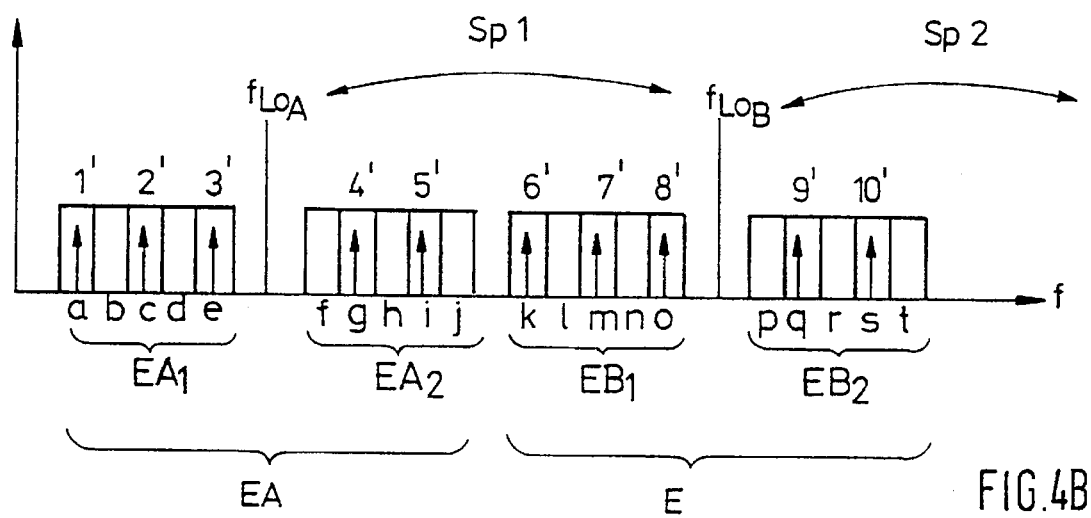

With reference to FIGS. 4b and 5b it is shown how, for multichannel operation, the frequencies of signals are selected which are transmitted simultaneously from a transmitter to the heterodyne receiver according to the invention, in order to obtain an advantageous embodiment of the invention. Within the operable frequency range of the heterodyne receiver, to which, according to the FIGS. 5a and 4a, belong also mirror frequency reception sections, the transmitter operating with the heterodyne receiver uses only those frequencies which are not mirror frequencies of other occupied frequencies. In other words: the allocation of frequencies to channels occurs such that the mirror frequency of an allocated frequency remains unallocated.

If the transmitter utilized two frequencies which are mirror frequencies of each other in the receiver, the receiver would convert both channels to the same intermediate frequency and a unambiguous signal reception would no longer be possible. The channel allocation at the transmitter site, according to the invention, assures an unambiguous signal reception at the receiver site.

FIG. 4b illustrates the channel allocation at the transmitter site according to the invention. Each of the reception sections, including those which are mirror frequency reception sections of each other, are divided into channels that can be allocated from the transmitter site. In the example shown in FIG. 4b, the frequencies a thru t can, therefore, be allocated from the transmitter site as a matter of principle. According to the invention, however, the transmitter allocates only those frequencies to channels, which are not mirror frequencies of each other.

The frequencies occupied by the transmitter are identified by an arrow, and the thereby established channels numbered with the numerals 1', 2' through 10'. For example, if a frequency a in the reception channel $EA_1$ is utilized, the corresponding mirror frequency j in the reception section $EA_2$ remains unutilized, as indicated by the arrows drawn. By this, a unambiguous reception of signals is secured, even if the mirror frequencies in the receiver are not suppressed.

A corresponding allocating of frequencies in the reception sections is also possible when the reception sections result from the heterodyne receiver tuning shown in FIG. 5a. In FIG. 5b the corresponding allocating of frequencies in the reception sections $EB_1$, $EA_2$, $EC_1$ and $EB_2$ is drawn as an example. Since these reception sections cover a wide frequency range nearly free of gaps, the frequencies of the channels in the transmitter can be selected equidistantly, which has advantages with respect to the stabilization of the frequencies. When an equidistant allocating of the reception frequencies to channels is wanted, the reception section $EA_1$ can be dropped.

In the exemplary embodiments of the invention, as shown in FIGS. 4 and 5, the frequency jumps SP of the oscillator 2 and the tuning range $\Delta f_{IF}$ of the IF stage are selected in such a way that reception sections, including their mirror frequency reception sections, do not overlap.

What is claimed is:

1. Optical heterodyne receiver comprising an optical oscillator for providing an oscillator signal, a mixing stage for receiving a received signal as well as the oscillator signal and for providing a difference frequency signal in response thereto, and an intermediate frequency stage responsive to the difference frequency signal for providing an output signal centered about an intermediate frequency, wherein the oscillator signal provided by the optical oscillator has an oscillator frequency which is tuneable only discontinuously, in jumps, and the output signal provided by the intermediate stage has an IF frequency which is tuneable continuously over a predetermined tuning range.

2. A receiver according to claim 1, wherein each of said jumps of the oscillator frequency is substantially greater than the tuning range of the intermediate frequency stage, and the jumps with which the optical oscillator is tuned, are selected such that the reception sections including their coordinated mirror frequency sections, which correspond to the various frequencies of the oscillator, do not overlap.

3. The receiver according to claim 1, wherein atomic or molecular resonances are utilized for the jump tuning of the optical oscillator.

4. The receiver according to claim 3, wherein an external cavity laser is utilized for the optical oscillator.

5. The receiver according to claim 1, wherein a tuneable microwave receiver is utilized as the intermediate frequency stage.

6. The receiver according to claim 1, wherein the frequency jumps of the oscillator and the tuning range of the intermediate frequency stage are such that the reception sections including their coordinated mirror frequency sections which correspond to the various possible frequencies of the oscillator are interleaved such that between a reception section and its coordinated mirror frequency section lie reception sections which are assigned to neighboring oscillator frequencies.

7. The receiver according to claim 1 in combination with a transmitter for multichannel transmission to provide a multi-channel communication system, wherein the transmitter does not utilize transmission frequencies which would correspond to mirror frequencies in the receiver of other transmission frequencies utilized by the transmitter.

* * * * *

UNITED STATES PATENT AND TRADEMARK OFFICE
CERTIFICATE OF CORRECTION

PATENT NO. : 5,631,760

DATED : May 20, 1997

INVENTOR(S) : Heidemann

It is certified that error appears in the above-identified patent and that said Letters Patent is hereby corrected as shown below:

In column 2, line 51, delete "feL" and substitute therefore --fe1--

In column 2, line 61, delete "fe2," and substitute therefore --fe2.--

In column 2, line 67, delete "GHZ" and substitute therefore --GHz--

In column 3, line 24, delete "fe*-fe |" and substitute therefore --|fe* -fe*|--

Signed and Sealed this

Ninth Day of December, 1997

Attest:

BRUCE LEHMAN

Attesting Officer

Commissioner of Patents and Trademarks